(12) United States Patent
Petschek et al.

(10) Patent No.: US 6,942,905 B1
(45) Date of Patent: Sep. 13, 2005

(54) BUFF-FREE LIQUID CRYSTAL ALIGNMENT USING POLY(IONOMER) COATINGS

(75) Inventors: Rolfe G. Petschek, Shaker Heights, OH (US); Daniel Harrison, Cleveland Heights, OH (US); Michael Fisch, Lakewood, OH (US)

(73) Assignee: Case Western Reserve University, Cleveland, OH (US)

( * ) Notice: Subject to any disclaimer, the term of this patent is extended or adjusted under 35 U.S.C. 154(b) by 0 days.

(21) Appl. No.: 09/284,828

(22) PCT Filed: Jan. 21, 1998

(86) PCT No.: PCT/US98/01195

§ 371 (c)(1),
(2), (4) Date: Apr. 21, 1999

(87) PCT Pub. No.: WO98/31772

PCT Pub. Date: Jul. 23, 1998

Related U.S. Application Data

(60) Provisional application No. 60/050,765, filed on Jun. 25, 1997, provisional application No. 60/034,966, filed on Jan. 21, 1997.

(51) Int. Cl.[7] ..................... C09K 19/38; C09K 19/54; G02F 1/1337

(52) U.S. Cl. ............... 428/1.2; 252/299.01; 252/299.5; 349/123

(58) Field of Search .................. 252/299.01, 29.5; 428/1.1, 1.2; 349/123

(56) References Cited

U.S. PATENT DOCUMENTS 5,639,398 A * 6/1997 Rhee et al. ............ 252/299.01
5,731,050 A * 3/1998 Kotsubo et al. ............. 428/1.1

OTHER PUBLICATIONS

Gohy et al., "Synthesis and Preliminary Characterization of Model Liquid Crystalline Ionomers", Marcomoleculaes 1996, 29, pp. 3376-3383, 1996.*
Cheng et al., "Novel Ion Containing Liquid Crystals and Liquid Crystalline Main Chain Polymers Based on Trans-1,2-Bis(4-Pyridyl Ethylene Mesogen", Mol. Cryst. Liq. Cryst., 1995, vol. 269, pp. 1-28, 1995.*

* cited by examiner

Primary Examiner—Shean C. Wu
(74) Attorney, Agent, or Firm—Tarolli, Sundheim, Covell & Tummino L.L.P.

(57) ABSTRACT

The present invention consists of materials and a processing method for coating rigid-rod poly(ionomers) or salts thereof, in a solvent system, directionally on charged surfaces resulting in the formation of liquid crystal display surfaces with planar alignment and pretilt.

22 Claims, 1 Drawing Sheet

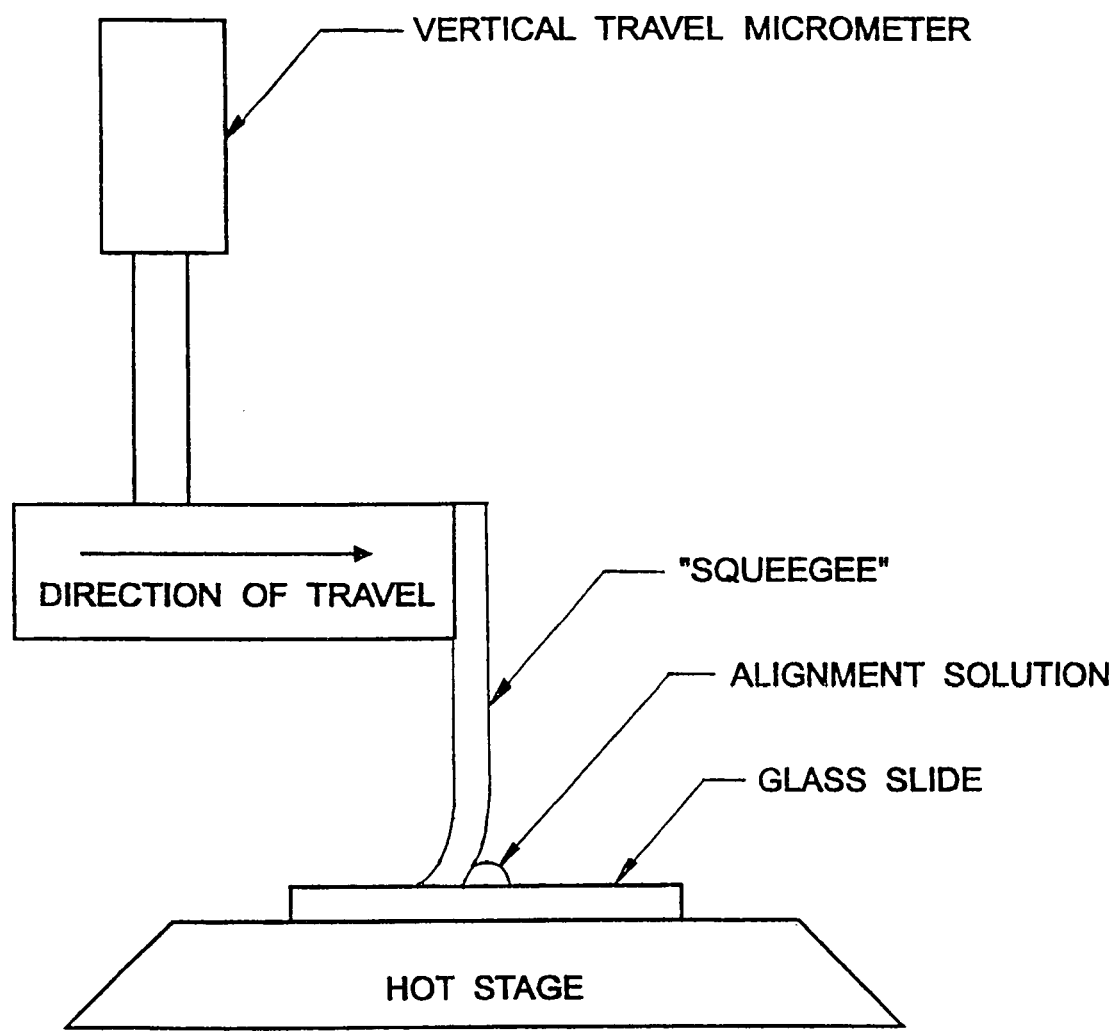

BUFF-FREE LIQUID CRYSTAL ALIGNMENT USING POLY(IONOMER) COATINGS

This application claims priority to the filing dates of U.S. Provisional Application No. 60/034,966, filed Jan. 21, 1997 and U.S. Provisional Application No. 60/050,765, filed Jun. 25, 1997.

This invention was made with government support under Grant No. DMR8920147 awarded by the National Science Foundation. The government has certain rights in this invention.

FIELD OF THE INVENTION

The present invention is directed to liquid crystal materials and a process for preparing a liquid crystal display. More specifically, the invention is directed to coating rigid-rod poly(ionomers), or salts thereof, directionally on charged surfaces resulting in the formation of surfaces with planar alignment and pretilt.

BACKGROUND OF THE INVENTION

Nematic, Smectic C and other liquid crystal devices are routinely used in display applications. They are also used in a variety of other devices, such as variable retarders and laser stabilizers, to control light. Most such devices require alignment layers, that is, layers on the surface of transparent electrodes which cause the special axes of the liquid crystal to align in a specific direction relative to the electrode surface.

The literature concerning liquid crystal displays is vast. The popular book "Liquid Crystals: Nature's Delicate Phase of Matter" by Peter Collings (Princeton Science Library, ©1990) is a readable introduction to the subject and is incorporated herein by reference.

Rubbed polyimides and polyimide-amides are the "standard" material used in the liquid crystal industry today for manufacturing liquid crystal displays. Rubbed nylon 6—6 and rubbed Teflon® are also known and used in liquid crystal research. However, there are few commercial uses in the liquid crystal industry for these types of alignment layers.

Rubbing, more commonly referred to as buffing, is a technique used to align liquid crystal material deposited onto the surface of a liquid crystal display. In practicing this buffing technique, thin coatings of a long chain polymer are applied to the facing surfaces of the two transparent plates between which the liquid crystal layer is disposed. By subsequently rubbing these coatings with a soft material such as cotton cloth or paper, the molecules on the respective coatings can be oriented so that the long axes of the liquid crystal molecules adjacent the respective plates will align parallel to the rubbing direction. This technique, however, has several inherent disadvantages. First, the rubbing operation introduces unwanted contamination onto the polymer coatings because the materials which are used to rub the polymer are generally something other than the polymer itself. For example, cotton or paper are commonly used to rub or buff the polymeric liquid crystals into the desired alignment. Unwanted contaminants from the paper or cotton buffing medium may remain on the liquid crystal surface after the buffing is complete or may contaminate clean-room manufacturing facilities. Second, the rubbing operation introduces considerable shearing forces on the polymer film and may tear the film away from the substrate during manufacture.

Further, buffing generates static electricity which may modify or destroy the underlying active matrix (transistor array) in certain displays. It is also rather ill controlled and depends on a number of poorly understood parameters such as the exact nature of the rubbing cloth, the processing of the polyimide, the humidity of the manufacturing plant, etc. A significant difficulty is that it is not well understood which parameters the buffing does depend on. This results appreciable loss of nearly finished (but inoperative) product and loss of through-put.

Materials modified by exposure to Ultra Violet (UV) light are under development. There are some technical difficulties associated with the UV exposure. Achieving and controlling pre-tilt has not yet been well demonstrated in such systems. The chemical reactivity of the starting materials as well as the reactivity of the final structures is a difficulty. However, patterning the direction of the alignment is more easily accomplished by utilizing the UV method.

Langmuir-Blodgett (L-B) films are also under development. However, there is no clear evidence that this can be done sufficiently quickly and reproducibly for a commercially viable manufacturing process. There are also severe cleanliness issues which are of concern in connection with the production of L-B films.

Obliquely evaporated silicon dioxide films are old, expensive technologies. They require rather good vacuums, slow and expensive evaporators, and are not currently used extensively in industry.

Other processes for producing aligned liquid crystal displays are disclosed in the following U.S. patents:

Harsch (U.S. Pat. No. 3,941,901) disclose a surface alignment method for liquid crystal cells. The method of Harsch comprises applying to the surfaces of transparent plates bounding a liquid crystal film, a long chain polymer such as polyvinyl alcohol or polyvinyl butyral, which is subjected to a shear thinning technique to cause elongation and alignment of these long chain polymers. The polymers used by Harsch are non-rigid, non-ionic polymers.

Omeis et al. (U.S. Pat. No. 5,247,377) relates to a process for producing thin, anisotropic layers composed of liquid crystalline substances. The liquid crystalline substances are applied in a thin layer to one side of a support having a surface restructured in such a way that the structure is given a preferred direction which determines orientation of the liquid crystalline substance and data storage devices produced.

Various compositions are used to prepare liquid crystal displays. For example, Ahne et al. (U.S. Pat. No. 4,619,500) relates to a method for producing orientation layers for liquid crystal displays wherein a solution of an organic prepolymer of polyoxozoles, polythiazoles, polyimidazoles, polyoxazinones, polyoxazine diones or polyquinoxalines is applied to a transparent substrate and subsequently annealed and subjected to an orientation treatment. Such orientation treatments include buffing.

Coates et al. (U.S. Pat. No. 5,426,009) relates to a polymeric composite material which is based on a liquid crystal polymer component. The polymeric composite of Coates exhibits a high glass transition temperature of at least 60° C. and a scattering texture when deposited as a thin film. The polymeric composites of Coates can be rendered transparent by being heated above the glass transition temperature and/or clearing temperature. The polymeric composites of Coates are obtained by mixing a liquid crystal polymer component, a reactive liquid crystalline component, optionally a polymerization initiator component, and/or further additive components, with subsequent polymerization.

However, up to the present time, it has not been known to utilize a rigid-rod poly(ionomer) composition in a buff-free alignment process to produce a liquid crystal display device having planar alignment and pretilt.

SUMMARY OF THE INVENTION

The present invention concerns a composition and method for coating rigid-rod poly(ionomers) directionally on charged surfaces resulting in the formation of liquid crystal display surfaces with planar alignment and pretilt.

More specifically, this invention relates to a process and class of materials for applying such liquid crystal alignment layers. It consists of applying a dilute, solution of a rigid-rod poly(ionomer) and a low molecular weight ion with the opposite charge, to the surface of an electrode using a directional coating technique such as meniscus coating, capillary action, brushing, or drawing the solution over the surface directionally using a rubber wiper or "squeegee" (doctor bar).

Alternatively, a basic or acidic ionizable rigid-rod polymer dissolved in a solvent of appropriate acidity so that the resultant rigid-rod polymer is charged, may also be used.

Accordingly, an object of the present invention is to provide a buff-free method of producing liquid crystal display devices having acceptable planar alignment and pretilt.

Advantages of utilizing the present rigid-rod poly(ionomer) composition and coating technique compared to the buffing technique of the prior art include, but are not limited to, those set forth below.

A first advantage is that the present process is less invasive in that the polymeric material is added to the electrode surface compared to removal through buffing.

A further advantage of the present process is that the process is cleaner, in that many devices utilizing the technology of the present invention must be manufactured primarily in clean rooms.

Another advantage is that the present process can be performed within the storage and operating temperature of most liquid crystal devices. Prior art polyimides, for example, require a "bake" at an order of 150° C. which is outside normal LCD operating and storage temperatures.

Other advantages and benefits of the invention will become apparent to those skilled in the art upon reading and understanding the following detailed description of the preferred embodiments.

BRIEF DESCRIPTION OF THE DRAWING

The FIGURE is a depiction of the process of the invention utilizing a "squeegee" apparatus to apply the rigid-rod poly(ionomer) alignment solution to a glass surface.

DETAILED DESCRIPTION OF THE PREFERRED EMBODIMENTS

Many rigid rod polyionomers are known. A variety of proteins, the polysaccharide xanthan gum and other biological products are essentially rigid rods and have ionic or ionizable moieties attached. There are also synthetic materials such as positively charged poly(pyridinium) salts having the following formula:

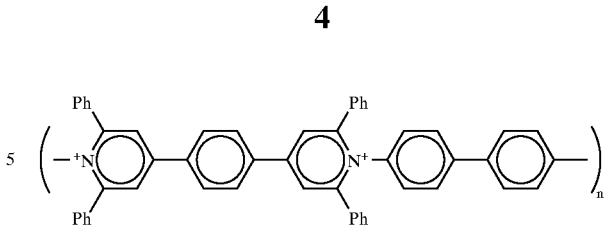

wherein the intrinsic viscosity is in excess of 5, and negatively charged poly(benzimidazole-sulfonates) of the formula:

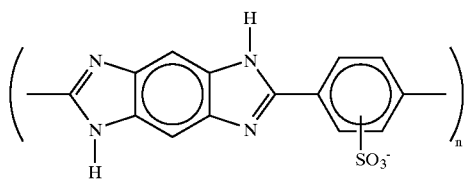

wherein the intrinsic viscosity is in excess of 3.

Each of these synthetic polymers is made by polycondensation reactions. Therefore, structural modifications and the formation of co-polymers should be well within the ordinary skills of those practicing in the art. Structural modification of rigid-rod poly(ionomers) will permit small changes in pretilt to be achieved in various conditions. It is expected that polyionomers with larger optical polarizabilities along the long axis of the polymer will be superior to polymers without this character for "typical" systems in which the nematic has positive birefringence as this will favor the proposed alignment.

Most liquid crystal display surfaces contain or can be engineered to contain positively or negatively charged ions. The surfaces of glass and indium tin oxide (ITO) generally have "dangling bonds" consisting of negatively charged oxygens which will typically have a hydrogen ion associated with them. However, this hydrogen ion can be easily removed by washing in a weak base. Other surfaces, for example metals and other metal oxides, often have such exposed ions as well. Organic surfaces (e.g. polystyrene surfaces) often do not have such exposed ions (or only a few). However organic surfaces can generally be modified so as to have a number of such exposed ions. For example, a copolymer of styrene and styrene sulfonate will have exposed sulfonate ions on the surface; the addition of a dicarboxylic acid to a polyamic acid prior to heating to drive off water and form a polyimide will result in exposed carboxylic acid ions. Thus many surfaces can be made to have charges chemically bonded thereto. These charged surfaces can then bind oppositely charged polymers such as the rigid-rod poly(ionomers) of the present invention. This will generally result in a surface with the opposite charge of the original base surface which can then again be coated with another polyionomer having an opposite charge. Thus, it is possible to make multi-layered rigid-rod poly(ionomer) coatings on many surfaces.

It is important in a variety of liquid crystal devices to have surfaces coated directionally so that when materials in various liquid crystalline phases are next to the surface they will have specific directions relative to the surface. One important such alignment is a homogeneous planar alignment in which the direction of a nematic liquid crystal phase (which has as its only order a uniaxial alignment of the molecules) aligns close to the surface in a single direction which is close to being in the plane of the surface. The angle which this direction makes to the plane of the surface is important to the operation of many devices and is called the "pre-tilt". This alignment is also important in a variety of devices using smectic C liquid crystals (specifically those based on Clark-Lagerwald cells) as such planar alignment of a nematic is important in the formation of the ultimate alignment of the smectic C liquid crystal. There are additional constraints on the alignment layers in the smectic C phase in such devices, specifically that a "pre-tilted bookshelf" alignment form in the smectic C phase and that there not be a large energy difference between the two different states with polarization toward and away from the surface.

In order to achieve planar alignment with a definite pre-tilt, it is necessary to have a single direction application of the poly(ionomer) composition involved in the coating process. The coating process of the present invention can be practiced with a variety of single direction applicators and techniques, including brushes, meniscus coating techniques, capillary action coating, spraying, and coating with a semi-flexible rubber sheet or "squeegee".

In practicing the coating process according to the present invention, the rigid-rod poly(ionomers) are generally dissolved in an appropriate aprotic polar solvent such as dimethylsulfoxide (DMSO) or water. The solute is present in a range of from about 0.005 wt. percent to about 0.02 wt. percent.

As a final step in the process of the present invention, drying of the coated poly(ionomer) film is essential to remove any excess solvent. Improved results are achieved as the drying time is reduced.

The following example demonstrates coating of rigid-rod poly(ionomers) onto transparent electrode surfaces to form liquid crystal cells using the process of the present invention.

EXAMPLE 1

In this example, a squeegee was cut to have two sharp angles (approximately 90 degrees) on the side which was designed to engage the surface being coated. The specific coating apparatus is shown in the Figure. The surface being coated was negatively charged ITO coated glass which was cleaned prior to polymer coating. The ITO coated glass was placed horizontally on a hot plate and the hot plate was maintained at a temperature of approximately 60° C. The glass surface was then coated with a solution of poly (pyridinium) salt dissolved in dimethylsulfoxide (DMSO). The squeegee was then brought into contact with the poly (pyridinium) coated surface and drawn across it at a velocity of approximately one mm/second. The downward force on the squeegee was adjusted so that there was a film several microns thick (as observed by optic interference fringes) directly behind the squeegee during the process. The solvent was then allowed to evaporate. The quality of alignment was ascertained by constructing standard liquid crystal cells of approximately 12 microns in thickness with the coating directions of the two substrates aligned anti-parallel, examining the optical properties of both the cell of the present invention and a standard rubbed polyimide cell under a polarized microscope and comparing the alignment of the cell prepared by the present inventions process to that of the standard cell.

The cell prepared by drawing the squeegee across the rigid-rod poly(ionomer) coated surface one time had reasonable alignment. Further tests have shown that drawing the squeegee across a second or third time with a small amount of the polymer solution in front of the squeegee produced very good alignment.

Use of a chiral polyionomer changes the symmetry of the coated surface. If the coating material is nonchiral then the properties of the surface are unchanged when it is reflected through a plane including the plane normal to the surface and the coating direction. If the system is chiral, no such symmetry exists. In the presence of a mirror plane the alignment direction of the liquid crystal must either be in the mirror plane (observed) or have two degenerate directions which are mirror images through this plane (not yet observed). If there is no such symmetry then the alignment direction is not constrained and can have any relation to the coating direction. A chiral material, xanthan gum, dissolved in water has been applied to ITO coated glass using a brush or squeegee. Good alignment of the liquid crystal is observed at an angle (15 degrees) to the brushing direction. This angle will be proportional to the enantiomeric excess. Such predictable and controllable angular changes of the alignment direction to the coating direction are useful in some applications.

Excellent alignment has been achieved by coating ITO coated glass using a brush and either (i) a poly(pyridinium) salt dissolved in DMSO or (ii) xanthan gum dissolved in water. The coating was performed by brushing the poly (ionomer) coated surface several times at a rate of approximately one mm/second. The surface is brushed first in one direction and then in the opposite direction. The brush should be displaced perpendicular to the brushing direction between successive brushings. The direction of alignment and pre-tilt are controlled by the direction of the final brushing. As a final drying step, the solvent is allowed to evaporate.

Thermal stability is important in the manufacture of liquid crystal cells. Liquid crystal surfaces prepared according to the present invention have been exposed to temperature of 150–160° C. for fifteen to twenty minutes with no apparent degradation of alignment. Visual observation, in fact, suggests some improvement on heat treatment. Similarly, treatment of the surface after coating with solvents may be important in manufacturing. We have verified that washing the surface with the solvents in which the polymers dissolve does not significantly degrade the alignment properties of the surface. Some liquid crystal devices require two different alignment layers (e.g. a homeotropic alignment) (alignment normal to the surface) and a planar alignment with pretilt, as achieved using our surfaces. We have prepared such a cell. It shows the expected alignment. A cell prepared using a squeegee and poly(pyridinium) salt in DMSO was characterized as having pretilt between 0.5 and 1 degrees, which is within the range of industrially interesting pretilts.

The invention has been described with reference to the preferred embodiments. Obviously, modifications and alterations will occur to others upon reading and understanding the preceding detailed description. It is intended that the invention be construed as including all such modifications and alterations insofar as they come within the scope of the appended claims or the equivalents thereof.

Having thus described the invention, it is claimed:

1. A coating composition for attaining buff-free alignment of liquid crystals on a liquid crystal display device, the coating composition comprising a positively or negatively charged heterocyclic rigid-rod poly(ionomer) or salt thereof, with (i) a low molecular weight counter-ion or (ii) a basic or acidic ionizable rigid-rod polymer, and a solvent which is capable of dissolving the heterocyclic rigid-rod poly(ionomer) or salt thereof.

2. The coating composition of claim 1 wherein the heterocyclic rigid-rod poly(ionomer) is an N-substituted heterocyclic rigid-rod poly(ionomer).

3. The coating composition of claim 1 wherein the heterocyclic rigid-rod poly(ionomer) is a positively charged poly(pyridinium) salt.

4. The coating composition of claim 1 wherein the heterocyclic rigid-rod poly(ionomer) is a negatively charged poly(benzimidazole-sulfonate) or salt thereof.

5. A coating composition for attaining buff-free alignment of liquid crystals on a liquid crystal display device, the coating composition comprising a rigid-rod poly(ionomer) or salt thereof, with (i) a low molecular weight counter-ion or (ii) a basic or acidic ionizable rigid-rod polymer, and a solvent which is capable of dissolving the rigid-rod poly (ionomer) or salt thereof wherein the rigid-rod poly(ionomer) is xanthan gum.

6. The coating composition of claim 1 wherein the solvent is a polar aprotic solvent.

7. The coating composition of claim 1 wherein solvent is water or dimethylsulfoxide (DMSO).

8. The coating composition of claim 3 wherein DMSO is utilized as a solvent for the positively charged poly (pyridinium) salt.

9. The process for manufacturing a buff-free liquid crystal display with planar alignment which comprises applying the composition of claim 1 to an oppositely charged surface of an electrode, followed by a drying step wherein the application step causes the axes of the rigid-rod poly(ionomers) to align in a planar direction with pretilt.

10. The process of claim 9 wherein the heterocyclic rigid-rod poly(ionomer) is a positively charged poly(pyridinium) salt.

11. A process of claim 10 wherein the heterocyclic rigid-rod poly(ionomer) is a negatively charged poly (benzimidazole-sulfonate) salt.

12. The process of claim 9 wherein the application step is accomplished by a squeegee.

13. The process of claim 9 wherein the application step is accomplished by brushing, spraying, capillary action or meniscus coating.

14. The process of claim 9 wherein the charged transparent electrode surface is glass or indium tin oxide (ITO) having a negative charge.

15. The process of claim 14 wherein a poly(pyridinium), dissolved in DMSO with a counter-ion, is coated by a squeegee onto the negatively charged glass or ITO surface.

16. The process for manufacturing a buff-free liquid crystal display having planar alignment and pretilt which comprises application of a positively charged rigid-rod poly(ionomer) or salt thereof dissolved in a solvent, said application being by a squeegee, to a transparent negatively charged glass or indium tin oxide (ITO) electrode surface followed by a drying step wherein the application via squeegee causes the axes of the rigid-rod poly(ionomer) to align in a planar direction with pretilt.

17. The process of claim 16 wherein the rigid-rod poly (ionomer) is poly(pyridinium) salt and the solvent is dimethylsulfoxide (DMSO).

18. A process for manufacturing a buff-free liquid crystal display with planar alignment which comprises applying the composition of claim 5 to an oppositely charged surface of an electrode, followed by a drying step wherein the application step causes the axes of the xanthan gum rigid-rod poly(ionomer) to align in a planar direction with pretilt.

19. The process of claim 18 wherein the application step is accomplished by a squeegee.

20. The process of claim 18 wherein the application step is accomplished by brushing, spraying, capillary action or meniscus coating.

21. The process of claim 18 wherein the charged electrode surface is a glass or indium tin oxide (ITO) having a negative charge.

22. The composition of claim 5 wherein the solvent is water.

* * * * *

UNITED STATES PATENT AND TRADEMARK OFFICE
CERTIFICATE OF CORRECTION

PATENT NO. : 6,942,905 B1
DATED : September 13, 2005
INVENTOR(S) : Rolfe G. Petschek, Daniel Harrison and Michael Fisch It is certified that error appears in the above-identified patent and that said Letters Patent is hereby corrected as shown below:

<u>Column 7,</u>
Line 34, after "claim" change "10" to -- 9 --.

Signed and Sealed this

Twenty-seventh Day of December, 2005

JON W. DUDAS
*Director of the United States Patent and Trademark Office*